US008056971B2

(12) United States Patent  
Marsden et al.

(10) Patent No.: US 8,056,971 B2
(45) Date of Patent: Nov. 15, 2011

(54) ENERGY-DISSIPATION SYSTEM

(75) Inventors: Andrew W. Marsden, Hingham, MA (US); Ward Fritz, Chelsea, MA (US); Walter S. Bezaniuk, Berkley, MA (US); Joe Langley, Foxboro, MA (US); David Amirault, Easton, MA (US)

(73) Assignee: Cosco Management, Inc., Wilmington, DE (US)

( * ) Notice: Subject to any disclaimer, the term of this patent is extended or adjusted under 35 U.S.C. 154(b) by 169 days.

(21) Appl. No.: 12/469,329

(22) Filed: May 20, 2009

(65) Prior Publication Data

US 2010/0295341 A1 Nov. 25, 2010

(51) Int. Cl.
*B60N 2/42* (2006.01)

(52) U.S. Cl. .................. 297/216.11; 297/216.1
(58) Field of Classification Search ........... 297/216.1, 297/216.11; 280/739, 729, 728.1, 730.1; 180/271, 274
See application file for complete search history.

(56) References Cited

U.S. PATENT DOCUMENTS

| | | | |
|---|---|---|---|
| 4,213,202 A * | 7/1980 | Larry ........................... | 2/456 |
| 4,534,068 A * | 8/1985 | Mitchell et al. ............... | 2/414 |
| 4,642,814 A * | 2/1987 | Godfrey ........................ | 2/462 |
| 4,883,299 A * | 11/1989 | Bonar ........................... | 293/110 |
| 4,899,961 A | 2/1990 | Herndon | |
| 4,919,483 A | 4/1990 | Horkey | |
| 5,235,715 A | 8/1993 | Donzis | |
| 5,292,175 A | 3/1994 | Artz | |
| 5,292,176 A | 3/1994 | Artz | |
| 5,335,968 A | 8/1994 | Sheridan et al. | |
| 5,567,015 A | 10/1996 | Arias | |
| 5,881,395 A | 3/1999 | Donzis | |
| 6,485,101 B2 | 11/2002 | Kassai et al. | |
| 6,519,780 B2 | 2/2003 | Goodwin | |
| 7,125,073 B2 | 10/2006 | Yoshida | |
| 7,232,182 B2 | 6/2007 | Yoshida | |
| 7,234,771 B2 | 6/2007 | Nakhla | |
| 7,246,853 B2 | 7/2007 | Harcourt et al. | |
| 7,293,828 B2 * | 11/2007 | Yoshida ................. | 297/216.11 |
| 7,654,613 B2 | 2/2010 | Bass | |
| 7,717,506 B2 | 5/2010 | Amesar et al. | |
| 7,726,734 B2 | 6/2010 | Mahal et al. | |
| 7,744,154 B2 | 6/2010 | Marsden et al. | |
| 7,748,781 B2 | 7/2010 | Bass | |
| 7,774,866 B2 * | 8/2010 | Ferrara .......................... | 2/455 |
| 2001/0043001 A1 | 11/2001 | Kassai et al. | |
| 2002/0153753 A1 | 10/2002 | Kassai | |
| 2007/0085394 A1 | 4/2007 | Yang | |

(Continued)

FOREIGN PATENT DOCUMENTS

EP 0928718 7/1999

(Continued)

OTHER PUBLICATIONS

International Search Report dated Feb. 13, 2009, for International Application No. PCT/US2008/087382.

(Continued)

*Primary Examiner* — Sarah B McPartlin
(74) *Attorney, Agent, or Firm* — Barnes & Thornburg LLP

(57) ABSTRACT

A child restraint includes a juvenile vehicle seat and an energy-absorption apparatus coupled to the juvenile vehicle seat. The energy-absorption apparatus is configured to absorb external energy associated with an external impact force applied to the energy-absorption apparatus.

18 Claims, 3 Drawing Sheets

U.S. PATENT DOCUMENTS

| | | | |
|---|---|---|---|
| 2007/0252418 | A1 | 11/2007 | Harcourt et al. |
| 2008/0258518 | A1 | 10/2008 | Santamaria |
| 2009/0066125 | A1* | 3/2009 | Nett et al. ................. 297/216.11 |
| 2009/0152913 | A1 | 6/2009 | Amesar et al. |
| 2009/0179469 | A1 | 7/2009 | Bass |
| 2009/0179470 | A1 | 7/2009 | Bass |
| 2009/0256404 | A1 | 10/2009 | Strong et al. |
| 2010/0019554 | A1 | 1/2010 | Mahal et al. |
| 2010/0026064 | A1 | 2/2010 | Marsden et al. |
| 2010/0134470 | A1 | 6/2010 | Bu et al. |
| 2010/0194158 | A1* | 8/2010 | Mahal et al. ............. 297/216.11 |

FOREIGN PATENT DOCUMENTS

| | | |
|---|---|---|
| EP | 1167114 | 1/2002 |
| WO | 2009076514 | 6/2009 |

OTHER PUBLICATIONS

International Preliminary Report on Patentability (Ch. II) issued in connection with PCT/US2008/087382 and completed by the US Examining Authority on Oct. 9, 2010.

European Search Report dated Aug. 31, 2010, for related European Application No. EP 10163494.

* cited by examiner

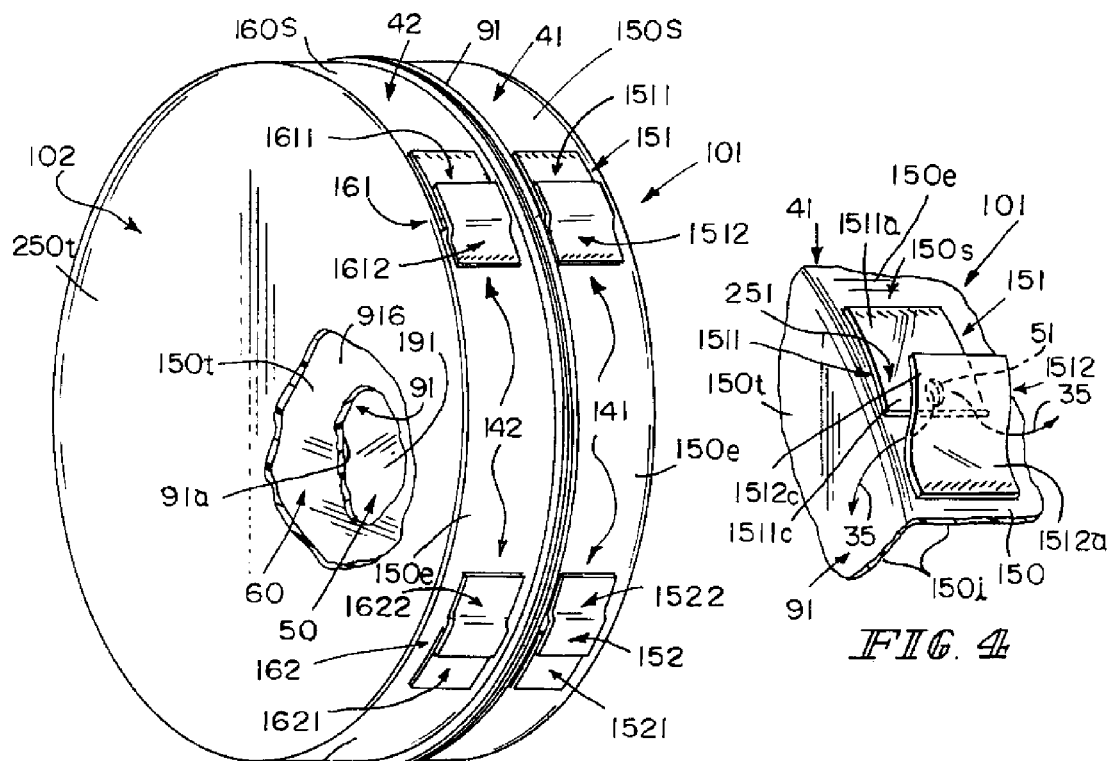
FIG. 3
FIG. 4
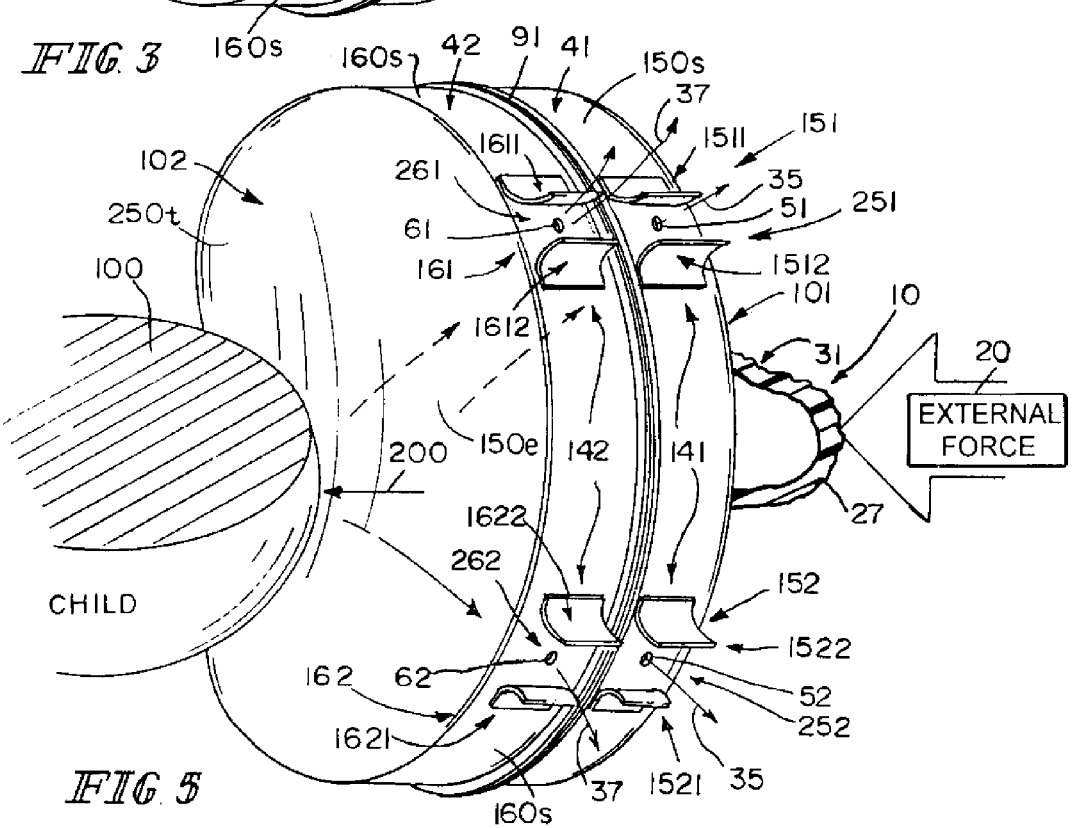
FIG. 5

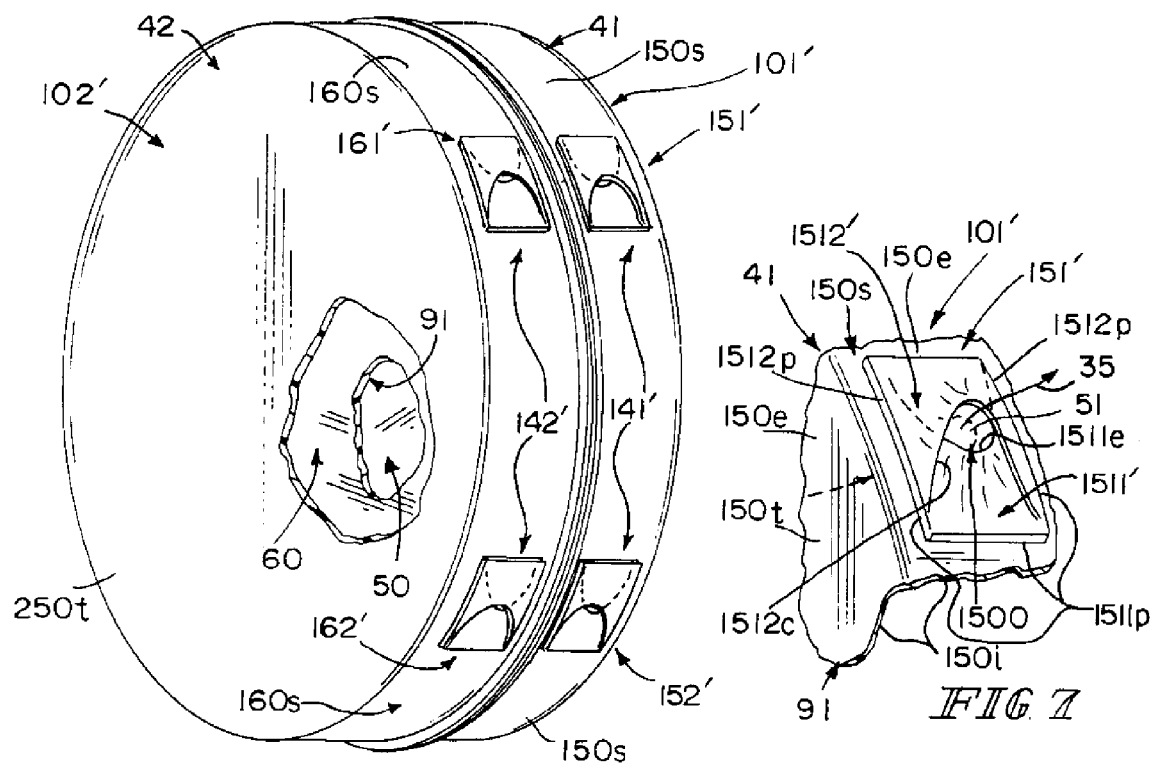
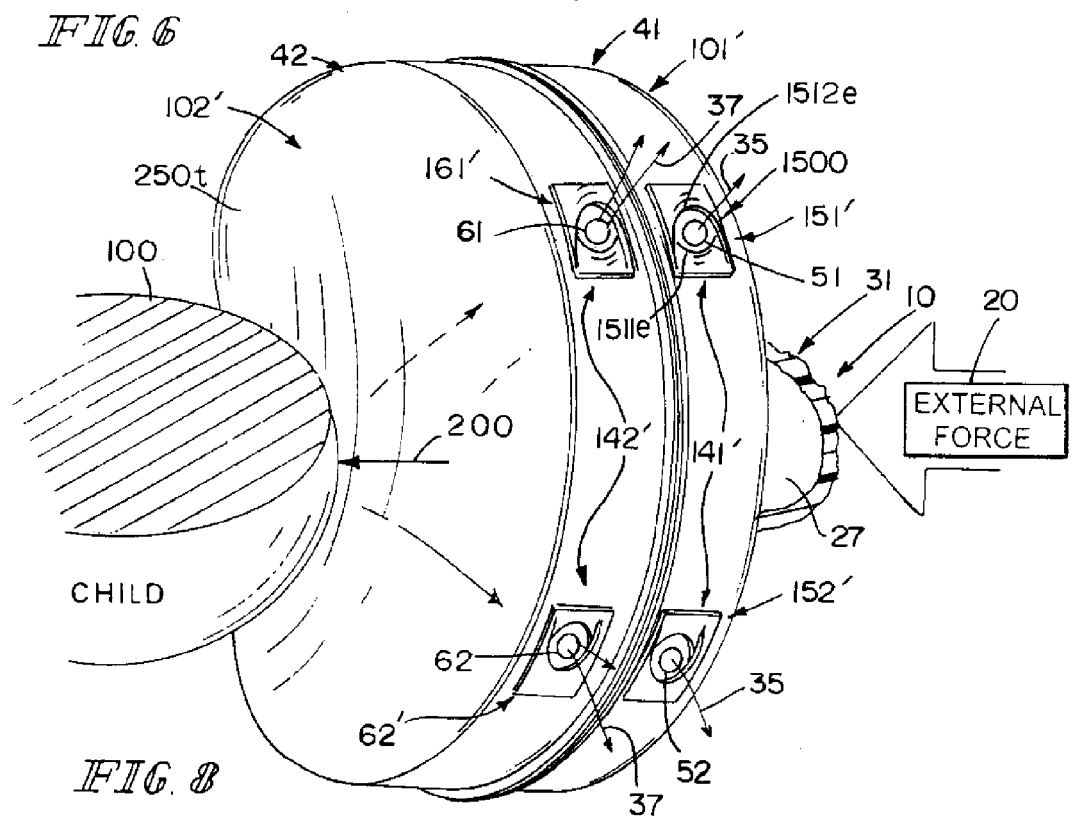

ENERGY-DISSIPATION SYSTEM

BACKGROUND

The present disclosure relates to energy-absorbing apparatus, and in particular, to devices for dissipating energy associated with external impact forces. More particularly, the present disclosure relates to an energy-dissipation system included in a juvenile product such as a child-restraint system.

When exposed to an external impact force, a juvenile vehicle seat at rest on a seat in a car or truck will accelerate as it moves to a new location in the passenger compartment of a car or truck. A child seated in such a moving juvenile vehicle seat will also accelerate as the juvenile vehicle seat moves in the passenger compartment.

A g-load is a measurement of an object's acceleration measured in gs. The g is a non-SI unit equal to the nominal acceleration due to gravity on earth at sea level. A short-term acceleration experienced by a child seated in a juvenile vehicle seat (or any other juvenile seat) that moves suddenly is called a shock and is measured in gs.

SUMMARY

An energy-dissipation system in accordance with the present disclosure is included in an apparatus that is exposed to external impact forces. In an illustrative embodiment, the energy-dissipation system is coupled to a juvenile vehicle seat to provide a child-restraint system.

In illustrative embodiments, the energy-dissipation system includes a ride-down pad coupled to a headrest included in a juvenile vehicle seat. The ride-down pad includes one or more force dissipaters.

Each illustrative force dissipater includes an air bag formed to include an air chamber and vent means for venting pressurized air developed in the air chamber through an air-discharge port formed in the air bag to the surroundings outside the air bag only during deformation of that air bag caused by exposure of that air bag to an external impact force associated with an external impact force applied to the juvenile vehicle seat.

When the juvenile vehicle seat is exposed to an external impact force, each air bag is deformed when exposed to such a force. The normally inflated air bag(s) deflate to cause the ride-down pad to absorb external energy associated with the external impact force to minimize g-loads experienced by a child seated on the juvenile vehicle seat.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 3 is a perspective view of a portion of the right-side ride-down pad of FIG. 2, with portions broken away, showing that the first force dissipater (on the right) includes two normally closed valve units mounted on a first air bag, the second force dissipater (on the left) also includes two normally closed valve units mounted on a second air bag, and each normally closed valve unit includes two valve flaps arranged to lie in overlapping relation to one another to assume a port-closing position closing a companion air-discharge port formed in the companion air bag;

FIG. 4 is an enlarged partial perspective view showing the first valve unit included in the first force dissipater during movement of the valve flaps from the port-closing position toward a port-opening position;

FIG. 5 is a perspective view similar to FIG. 3 showing that pressurized air developed in the first air chamber in the first air bag and in the second air chamber in the second air bag during deformation of the first and second air bags caused by application of an external impact force to the juvenile vehicle seat causes the four normally closed valve units to open to discharge pressurized air to the surroundings;

FIGS. 6-8 show valve units in accordance with another embodiment of the present disclosure;

FIG. 6 is a perspective view of a portion of right-side ride-down pad in accordance with another embodiment of the present disclosure, with portions broken away, showing that the first force dissipater (on the right) includes two normally closed valve units mounted on a first air bag, the second force dissipater (on the left) also includes two normally closed valve units mounted on a second air bag, and each normally closed valve unit includes two valve flaps arranged to lie in fully overlapping relation to one another to establish a port-closing position covering a companion air-discharge port formed in a companion air bag;

FIG. 7 is an enlarged partial perspective view showing the first valve unit included in the first force dissipater during movement of the valve flaps from the port-closing position toward a port-opening position wherein the valve flaps are arranged to lie in partly overlapping relation to one another; and FIG. 8 is a perspective view similar to FIG. 6 showing that pressurized air developed in the first air chamber in the first air bag and in the second air chamber in the second air bag caused by application of an external impact force to the juvenile vehicle seat causes the four normally valve units to open to discharge pressurized air to the surroundings.

DETAILED DESCRIPTION

Figure 1:
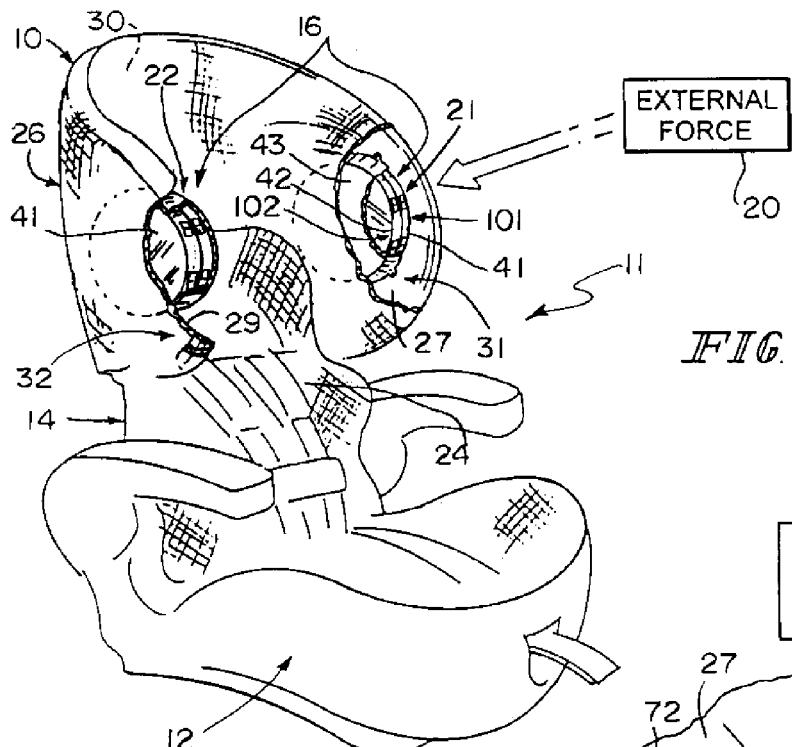
FIG. 1 is a perspective view of a child-restraint system including a juvenile vehicle seat having a seat bottom and a seat back extending upwardly from the seat bottom and an energy-dissipation system coupled to the seat back and made in accordance with a first embodiment of the present disclosure, with portions broken away, and showing that the seat back comprises a backrest coupled to the seat bottom and a headrest coupled to the backrest and that the energy-dissipation system comprises a right-side ride-down pad mounted on an inner wall of a first side-wing panel included in the headrest and a left-side ride-down pad mounted on an inner wall of an opposite second side-wing panel included in the headrest and showing an external impact force about to strike an outer portion of the first side-wing panel carrying the right-side ride-down pad.

An illustrative child-restraint system 11 includes a juvenile vehicle seat 10 and an energy-dissipation system 16 coupled to juvenile vehicle seat 10 as suggested in FIG. 1. In illustrative embodiments, juvenile vehicle seat 10 includes a seat bottom 12 and a seat back 14 extending upwardly from seat bottom 12 and carrying energy-dissipation system 16. One embodiment of an energy dissipation system is shown in FIGS. 1-5 and another embodiment of such a system is shown in FIGS. 6-8.

Each energy-dissipation system 16 comprises a ride-down pad that is designed to minimize the g-loads experienced by a child seated on seat bottom 12 of juvenile vehicle seat 10 during exposure of seat 10 to an external impact force. Ride-down pads 21, 22 are shown, for example, in FIG. 1. Reference is hereby made to U.S. application Ser. No. 12/327,376 filed Dec. 4, 2008, the entirety of which is hereby incorporated by reference herein, for disclosures of various ride-down pad configurations and mounting arrangements.

Figure 2:
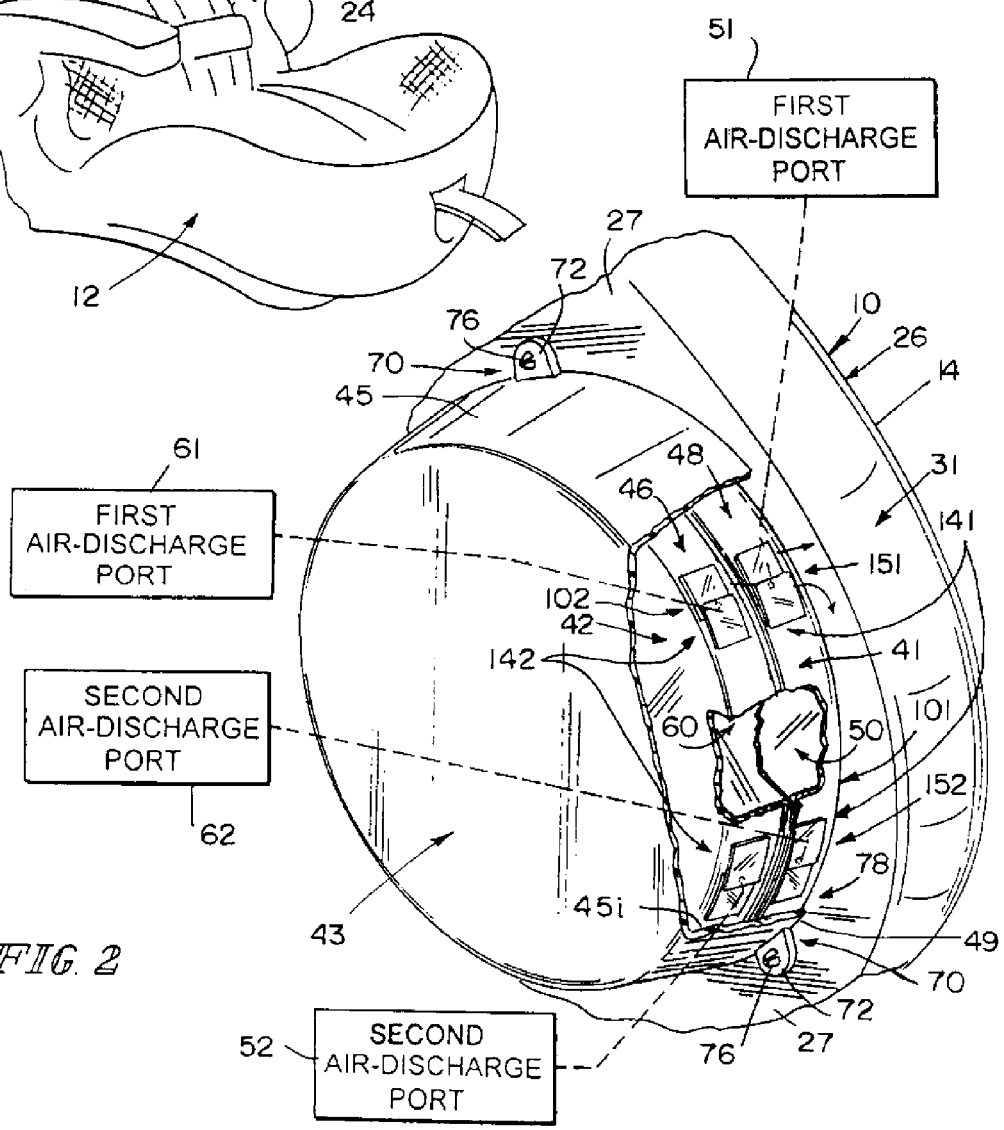
FIG. 2 is an enlarged perspective view of the right-side ride-down pad mounted on the first side-wing panel of the headrest shown in FIG. 1, with portions broken away, showing that the right-side ride-down pad includes a first force dissipater coupled to the juvenile vehicle seat, a second force dissipater coupled to the first force dissipater, and a shield coupled to the juvenile vehicle seat and formed to include an interior region containing the first and second force dissipaters, each force dissipater includes an air bag formed to include an air chamber and two air-discharge ports opening into the companion air chamber and a normally closed valve unit associated with each of the air-discharge ports.

As suggested in FIG. 1, seat back 12 of juvenile vehicle seat 10 includes a backrest 24 arranged to extend upwardly from seat bottom 12 and a headrest 26 coupled to backrest 24. Right-side ride-down pad 21 is coupled to an inner wall 27 of a first side-wing panel 31 included in headrest 26 as shown in FIGS. 1 and 2. Left-side ride-down pad 22 is coupled to an inner wall 29 of a second side-wing panel 32 included in headrest 26 as shown in FIG. 1. A rear panel 30 is included in headrest 26 and arranged to interconnect first and second side-wing panels 31, 32 as suggested in FIG. 1.

During a collision or other incident, application of an external impact force 20 to right-side ride-down pad 21 causes energy to be transferred from an impacting object (not shown) to right-side ride-down pad 21 as suggested in FIGS. 1 and 5. Ride-down pad 21 absorbs that transferred energy as suggested in FIG. 5 to minimize the magnitude of a resulting force 200 applied to a child 100 seated in juvenile vehicle seat 10 during the collision. Ride-down pad 21 functions to minimize the g-loads (acceleration) experienced by child 100 seated on seat bottom 12 of juvenile vehicle seat 10 during exposure of seat 10 to external impact force 20 as suggested in FIG. 5. Ride-down pad 21 also functions to maximize the time interval (i.e., ride-down time) between the moment the impacting object strikes ride-down pad 21 to apply the external impact force 20 and the moment that resulting force 200 reaches zero. Ride-down pad 22 functions in a manner similar to ride-down pad 21.

Right-side ride-down pad 21 includes a first force dissipater 101 including a first air bag 41 and a first airbag vent 141 and a second force dissipater 102 including a second air bag 42 and a second airbag vent 142 as shown, for example, in FIGS. 2, 3, and 5. Each of first and second air bags 41, 42 is inflated normally to assume an inflated shape as shown, for example, in FIGS. 1-3 and 5. First and second airbag vents 141, 142 normally are closed as suggested in FIGS. 2 and 3 to cause first and second air bags 41, 42 normally to remain in their inflated shapes. When exposed to external impact force 20, first and second air bags 41, 42 are squeezed between external impact force 20 and a child 100 seated in juvenile vehicle seat 10 and deform to increase the pressure of air extant in first and second air bags 41, 42 causing first and second airbag vents 141, 142 to open as suggested in FIG. 5. Air 35 is discharged from first air bag 41 and air 37 is discharged from second air bag 42 to absorb energy associated with external impact force 20 as described herein. Left-side ride-down pad 22 is similar in construction to right-side ride-down pad 21.

In illustrative embodiments, a deformable bag-shape retainer shield 43 is also included in right-side ride-down pad 21 to provide a protective cover for first and second air bags 41, 42 as suggested in FIG. 2. Deformable bag-shape retainer shield 43 is configured to provide means for retaining each of first and second air bags 41, 42 in its inflated shape until a sufficient external impact force 20 is applied to juvenile vehicle seat 10 to cause deformation of deformable bag-shape retainer shield 43 so that premature deflation of first and second air bags 41, 42 is avoided. A similar shield 43 is also included in left-side ride-down pad 22 in illustrative embodiments.

First air bag 41 is formed to include a first air chamber 50 and first and second air-discharge ports 51, 52 opening into first air chamber 50 as suggested in FIGS. 2, 3, and 5. First air chamber 50 is filled with air (or other suitable fluid) to cause first air bag 41 normally to assume an inflated shape as suggested in FIGS. 2, 3, and 5. At this stage, first airbag vent 141 is closed to block discharge of air from first air chamber 50 through first and second air-discharge ports 51, 52 to the surrounding outside first air bag 41 as suggested in FIGS. 1-3. In an illustrative embodiment, first air chamber 50 contains only air.

Second air bag 42 is formed to include a second air chamber 60 and first and second air-discharge ports 61, 62 opening into second air chamber 60 as suggested in FIGS. 2-5. Second air chamber 60 is filled with air (or other suitable fluid) to cause second air bag 42 normally to assume an inflated shape as suggested in FIGS. 2, 3, and 5. At this stage, second airbag vent 142 is also closed to block discharge of air from second air chamber 60 through first and second air-discharge ports 61, 62 to the surroundings outside second air bag 42 a suggested in FIGS. 1-3. In an illustrative embodiment, second air chamber 60 contains only air.

First airbag vent 141 is formed to include means for venting pressurized air developed in first air chamber 50 through one or more air-discharge ports (e.g., ports 51, 52) formed in first air bag 41 during deformation of first air bag 41 caused, for example, by exposure of first air bag 41 to an external impact force 20 applied to juvenile vehicle seat 10 as suggested in FIGS. 1-5. In an illustrative embodiment, first air bag 41 includes separate first and second air-discharge ports 51, 52 and first airbag vent 141 includes a first valve unit 151 associated with first air-discharge port 51 and a second valve unit 152 associated with second air-discharge port 52 as suggested in FIGS. 3 and 5. Each valve unit 151, 152 is configured to vent pressurized air in excess of a predetermined threshold level from first air chamber 50 therethrough to the surroundings during deformation of first air bag 41 as suggested in FIG. 5.

As suggested in FIGS. 3 and 5, first valve unit 151 is coupled to a side wall 150s of first air bag 41 and configured to regulate the flow of air through first air-discharge port 51 formed in that side wall 150s. In an illustrative embodiment, first valve unit 151 includes a first valve flap 1511 and a separate second valve flap 1512. Second valve flap 1512 is mounted for movement relative to first valve flap 1511 from a port-closing position (shown, for example, in FIG. 3) wherein first and second valve flaps 1511, 1512 cooperate to block discharge of air from first air chamber 50 to the surroundings outside first air bag 41 through first air-discharge port 51 to a port-opening position (shown, for example, in FIG. 5) wherein first and second valve flaps 1511, 1512 cooperate to form an air-conducting passageway 251 therebetween to allow discharge of air 35 from first air chamber 50 to the surroundings through first air-discharge port 51. In an illustrative embodiment, first and second valve flaps 1511, 1512 are arranged to lie in overlapping relation to one another as suggested in FIG. 3 when first and second valve flaps 1511, 1512 assume the port-closing position and to lie in separated relation to one another as suggested in FIG. 5 when first and second valve flaps 1511, 1512 assume the port-opening position.

As suggested in FIG. 4, first valve flap 1511 is made of a pliable elastic material and includes a first anchor 1511*a* and a first closure 1511*c*. First anchor 1511*a* is coupled to an exterior surface 150*e* of first air bag 41. First closure 1511*c* is coupled to first anchor 1511*a* for movement between a normally closed position (shown, for example, in FIG. 3) blocking discharge of air from first air chamber 50 to the surroundings through first air-discharge port 51 and an opened position (shown, for example, in FIG. 5) lying away from exterior surface 150*e* to unblock first air-discharge port 51 to allow discharge of air 35 from first air chamber 50 to the surroundings through first air discharge port 51.

As also suggested in FIG. 4, second valve flap 1512 is made of a pliable elastic material and includes a second anchor 1512*a* and a second closure 1512*c*. Second anchor 1512*a* is coupled to exterior surface 150*e* and arranged to lie in spaced-apart relation to first anchor 1512*a* to locate first air-discharge port 51 therebetween. Second closure 1512*c* is coupled to second anchor 1512*a* for movement between a normally closed position (shown, for example, in FIG. 3) trapping first closure 1511*c* between exterior surface 150*e* and second closure 1512*c* to block discharge of air from first air chamber 50 to the surroundings through first air-discharge port 51 and an opened position (shown, for example, in FIG. 5) lying away from first exterior surface 150*c* and freeing second closure 1512*c* to move away from exterior surface 150*e* to unblock first air-discharge port 51 to allow discharge of air 35 from first air chamber 50 to the surroundings through first air-discharge port 51.

As suggested in FIGS. 3 and 5, second valve unit 152 is coupled to side wall 150 of first air bag 41 and configured to regulate the flow of air through second air-discharge port 52. In an illustrative embodiment, second valve unit 152 includes a first valve flap 1521 and a separate second valve flap 1522. Each of first and second valve flaps 1521, 1522 is made of a pliable elastic material.

Second valve flap 1522 is mounted for movement relative to first valve flap 1521 from a port-closing position (shown, for example, in FIG. 3) wherein first and second valve flaps 1521, 1522 cooperate to block discharge of air from first air chamber 50 to the surroundings outside first air bag 41 through second air-discharge port 52 to a port-opening position (shown, for example, in FIG. 5) wherein first and second valve flaps 1521, 1522 cooperate to form an air-conducting passageway 252 therebetween to allow discharge of air 35 from first air chamber 50 to the surroundings through second air-discharge port 52. In an illustrative embodiment, first and second valve flaps 1521, 1522 are arranged to lie in overlapping relation to one another as suggested in FIG. 3 when first and second valve flaps 1521, 1522 assume the port-closing position and to lie in separated relation to one another as suggested in FIG. 5 when first and second valve flaps 1511, 1512 assume the port-opening position.

Second airbag vent 142 is formed to include means for venting pressurized air developed in second air chamber 60 through one or more air-discharge ports (e.g., ports 61, 62) formed in second air bag 42 during deformation of second air bag 42 caused, for example, by exposure of second air bag 42 to an external impact force 20 applied to juvenile vehicle seat 10 as suggested in FIGS. 1-5. In an illustrative embodiment, second air bag 42 includes separate first and second air-discharge ports 61, 62 and second airbag vent 142 includes a first valve unit 161 associated with first air-discharge port 61 and a second valve unit 162 associated with second air-discharge port 62 as suggested in FIGS. 3 and 5. Each valve unit 161, 162 is configured to vent pressurized air in excess of a predetermined threshold level from second air chamber 60 therethrough to the surroundings during deformation of second air bag 42 as suggested in FIG. 5.

As suggested in FIGS. 3 and 5, first valve unit 161 is coupled to side wall 160*s* of second air bag 42 and configured to regulate the flow of air through first air-discharge port 61. In an illustrative embodiment, first valve unit 161 includes a first valve flap 1611 and a separate second valve flap 1612. Each of first and second valve flaps 1611, 1612 are made of a pliable elastic material.

Second valve flap 1612 is mounted for movement relative to first valve flap 1611 from a port-closing position (shown, for example, in FIG. 3) wherein first and second valve flaps 1611, 1612 cooperate to block discharge of air from first air chamber 60 to the surroundings outside second air bag 42 through first air-discharge port 61 to a port-opening position (shown, for example, in FIG. 5) wherein first and second valve flaps 1611, 1612 cooperate to form an air-conducting passageway 261 therebetween to allow discharge of air 37 from second air chamber 60 to the surroundings through first air-discharge port 61. In an illustrative embodiment, first and second valve flaps 1611, 1612 are arranged to lie in overlapping relation to one another as suggested in FIG. 3 when first and second valve flaps 1611, 1612 assume the port-closing position and to lie in separated relation to one another as suggested in FIG. 5 when first and second valve flaps 1611, 1612 assume the port-opening position.

As suggested in FIGS. 3 and 5, second valve unit 162 is coupled to side wall 160*s* of second air bag 42 and configured to regulate the flow of air through second air-discharge port 62. In an illustrative embodiment, second valve unit 162 includes a first valve flap 1621 and a separate second valve flap 1622. Each of first and second valve flaps 1621, 1622 are made of a pliable elastic material.

Second valve flap 1622 is mounted for movement relative to first valve flap 1621 from a port-closing position (shown, for example, in FIG. 3) wherein first and second valve flaps 1621, 1622 cooperate to block discharge of air from second air chamber 60 to the surroundings outside second air bag 42 through second air-discharge port 62 to a port-opening position (shown, for example, in FIG. 5) wherein first and second valve flaps 1621, 1622 cooperate to form an air-conducting passageway 262 therebetween to allow discharge of air 37 from second air chamber 60 to the surroundings through second air-discharge port 62. In an illustrative embodiment, first and second valve flaps 1621, 1622 are arranged to lie in overlapping relation to one another as suggested in FIG. 3 when first and second valve flaps 1621, 1622 assume the port-closing position and to lie in separated relation to one another as suggested in FIG. 5 when first and second valve flaps 1621, 1622 assume the port-opening position.

Deformable bag-shape retainer shield 43 includes a top wall 44 and a side wall 45 coupled to top wall 44 to form an interior region 46 containing first and second air bags 41, 42 as suggested in FIGS. 2, 5, and 6. Shield 43 is bowl-shaped in an illustrative embodiment and is coupled to inner wall 27 of first side-wing panel 31 of headrest 26 to form a bag-receiving space 48 therebetween. Space 48 is substantially coextensive with interior region 46 of shield 43 as shown, for example, in FIG. 2. Shield 43 is made of a deformable but somewhat rigid (e.g., plastics) material to assume a predetermined shape to shield first and second air bags 41, 42 from incidental contact so that first and second air bags 41, 42 remain in their inflated shapes until shield 43 is deformed as suggested in FIG. 6 and first and second air bags 41, 42 are exposed to an external impact force and deflated partly or fully.

In an illustrative embodiment, top wall 44 of shield 43 is round and side wall 45 is an endless strip having a frustoconical shape as suggested in FIGS. 2 and 5. Side wall 45 is arranged to surround a perimeter edge of each of first and second air bags 41, 42 as suggested in FIG. 2. Top wall 44 is coupled to side wall 45 to lie in spaced-apart relation to a portion of inner wall 27 of first side-wing panel 31 to locate bag-receiving space 48 therebetween. Side wall 45 has an annular bottom edge 49 arranged normally to mate with inner wall 27 as suggested in FIGS. 2 and 5. Top wall 44 is made of a plastics material and arranged to cooperate with side wall 45 (also made of the same plastics material) to form a monolithic element as suggested in FIGS. 2 and 5. As a result, after shield 43 is deformed, each of first and second air bags 41, 42 will be exposed to an external impact force to change from the inflated shape to a deflated shape so that right-side ride-down pad 21 absorbs external energy associated with external impact force 20 to minimize g-loads experienced by child 100 seated in juvenile vehicle seat 10.

Child restraint 11 also includes anchor means 70 for coupling side wall 45 of deformable bag-shape retainer shield 43 to inner wall 27 of first side-wing panel 31 of headrest 26 as suggested in FIG. 2. Anchor means 70 includes a mount tab 72 coupled to side wall 45 and formed to include a fastener-receiver aperture 74 and an upstanding fastener 76 coupled to inner wall 27. Fastener 76 is arranged to extend through fastener-receiver aperture 74 as suggested in FIG. 2 to couple side wall 45 to inner wall 27. In an illustrative embodiment, there is not a sealed connection between side wall 45 and inner wall 27 and side wall 45 may deform somewhat or otherwise provide a vent space 78 between side wall 45 and inner wall 27 as suggested, for example, in FIGS. 2 and 6. In the illustrated embodiment, several companion pairs of mount tabs 72 and fasteners 76 are provided around the periphery of side wall 45.

In an illustrative embodiment, an outer cover 80 is coupled to headrest 26 and arranged to cover each of right-side and left-side ride-down pads 21, 22. Outer cover 80 functions to dissipate energy associated with external impact forces 20 and to protect ride-down pads 21, 22 from damage. In an illustrative embodiment, outer cover 80 includes an outer skin 82 and a cushion 84 under outer skin 82 as shown, for example, in FIGS. 5 and 6.

As suggested in FIG. 6, each of first and second air-discharge ports 51, 52 provided in first air bag 41 are formed to include means for discharging air from first air chamber 50 to surroundings (e.g., interior region 46 and bag-receiving space 48) outside first air bag 41 when first air bag 41 is exposed to external impact force 20 after deformation of deformable bag-shape retainer shield 43. Similarly, each of first and second air-discharge ports 61, 62 provided in second air bag 42 are formed to include means for discharging air from second air chamber 60 to surroundings (e.g., interior region 46 and bag-receiving space 48) outside second air bag 42 when second air bag 42 is exposed to external impact force 20 after deformation of deformable bag-shape retainer shield 43.

In the illustrated embodiment, an inner shell 90, and outer shell 92, and a partition 91 located between inner and outer shells 90, 92 cooperate to form first and second air bags 41, 42 as suggested in FIG. 5. Inner shell 90 includes top wall 150*t* and side wall 150*s*. Outer shell 92 includes top wall 160*t* and side wall 160*s*. An inner surface 91*a* of partition 91 mates with inner shell 90 to form first air chamber 50 therebetween and to define first air bag 41. An outer surface 91*b* of partition 90 mates with outer shell 90 to form second air chamber 60 therebetween and to define second air bag 42. Entirely separate first and second air bags could also be used and fall within the scope of the present disclosure. Each of air-discharge ports 51, 52, 61, 62 are arranged to face (i.e., open) toward an interior wall 45*i* of side wall 45 of deformable bag-shape retainer shield 43 as suggested for example, in FIGS. 2 and 5.

As suggested in FIG. 3, in illustrative embodiments, first air bag 41 includes a top portion 91, a bottom portion 191, and a side wall 150*s*. Bottom portion 191 is arranged to lie in spaced-apart relation to top portion 91 to define first air chamber 50 therebetween. Side wall 150*s* is arranged to interconnect top and bottom portions 91, 191 to define a boundary of first air chamber 50. As also suggested in FIGS. 3 and 4, first air bag 41 includes an interior surface 150*i* defining a boundary of first air chamber 50 and an exterior surface 150*e* facing away from first air chamber 50. Exterior surface 150*e* is arranged to lie between the interior surface 150*i* and first and second valve units 151, 152 as suggested in FIG. 4.

First and second force dissipaters 101', 102' in accordance with another embodiment of the present disclosure are shown, for example, in FIGS. 6-8. First force dissipater 101' includes first air bag 41 and a first airbag vent 141' comprising separate first and second valve units 151', 152' as suggested in FIGS. 6 and 8. Second force dissipater 102' includes second air bag 42 and a second airbag vent 142' comprising separate first and second valve units 261', 262' as suggested in FIGS. 6 and 8. Each of valve units 151', 152', 261', 262' is configured differently from counterpart valve units 151, 152, 261, 262; otherwise, first and second force dissipaters 101', 102' function in a manner similar to counterpart first and second force dissipaters 101, 102.

Each of valve units 151', 152', 261', 262' includes first and second valve flaps as suggested in FIGS. 6-8. Only the first and second valve flaps included in valve unit 151' will be described herein as they are similar in structure and function to the valve flaps of each of valve units 152', 261', and 262'.

In an illustrative embodiment, first valve unit 151' includes a first valve flap 1511' and a separate second valve flap 1512' as suggested in FIG. 7. First and second valve flaps 1511', 1512' are mounted on first air bag 41 for movement relative to one another as suggested in FIGS. 6-8.

First valve flap 1511' is made of a pliable elastic material and formed to include a parabola-shaped, concave, forward edge 1511*e*. First valve flap 1511' is coupled along a U-shaped, three-sided, perimeter edge 1511*p* to side wall 150*s* of first air bag 41 to present forward edge 1511*e* in close proximity to first air-discharge port 51.

Second valve flap 1512' is made of a pliable elastic material and formed to include a parabola-shaped, concave, forward edge 1512*e* as suggested in FIG. 7. Second valve flap 1512' is coupled along a U-shaped, three-sided, perimeter edge 1512*p* to one or both of side wall 150*s* or first valve flap 1512' as suggested in FIG. 7. Second valve flap 1512' is arranged to present forward edge 1512*e* in confronting and intersecting relation to forward edge 1511*e* as suggested in FIG. 7.

Each of first and second valve flaps 1511', 1512' is elastic and configured normally to assume a normally closed position covering first air-discharge port 51 to block discharge of air from first air chamber 50 in first air bag 41 to the surroundings as suggested in FIG. 6. Normally, as shown in FIG. 6, first and second valve flaps 1511', 1512' are arranged in fully overlapping relation to one another to establish a port-closing position.

When exposed to air in first air chamber 50, which air has been pressured to a level in excess of a predetermined minimum pressure during, for example, deformation of first air bag 41, each of first and second valve flaps 1511', 1512' are stretched elastically to assume a port-opening position as suggested in FIG. 8 wherein portions of concave forward edges 1511e, 1512e cooperate to form therebetween a vent aperture 1500 communicating with first air-discharge port 51. Vent aperture 1500 has a first size as shown in FIG. 7 as air pressure in first air chamber 50 starts to rise and first and second valve flaps 1511', 1512' are stretched somewhat. Then vent aperture 1500 has a relatively larger second size as shown in FIG. 8 as air pressure in first air chamber 50 rises further and first and second valve flaps 1511', 1512' are stretched further (but not beyond their elastic limit) to establish the port-opening positions of first and second valve flaps 1511', 1512'.

The invention claimed is:

1. A child restraint comprising
a juvenile vehicle seat and
an energy-dissipation system coupled to the juvenile vehicle seat, the energy-dissipation system including a first force dissipater including a first air bag formed to include a first air chamber and a first air-discharge port opening into the first air chamber and first vent means coupled to the first air bag for venting pressurized air developed in the first air chamber through the first air-discharge port during deformation of the first air bag caused by exposure of the first air bag to an external impact force associated with an external impact force applied to the juvenile vehicle seat, wherein the first air bag is formed to locate the first air-discharge port between the first air chamber and the first vent means, wherein the first air bag is undivided and further includes a second air-discharge port separated from the first air-discharge port and arranged to open into the first air chamber and the first vent means includes a first valve unit coupled to the first air bag and configured to regulate flow of air through the first air-discharge port and a separate second valve unit coupled to the wall and configured to regulate flow of air through the second air-discharge port.

2. The child restraint of claim 1, wherein the first air bag includes a top portion, a bottom portion arranged to lie in spaced-apart relation to the top portion to define the first air chamber therebetween, and a side wall arranged to interconnect the top and bottom portions and to define a boundary of the first air chamber and the side wall is formed to include the first air-discharge port and the first vent means is coupled to the side wall and arranged normally to close the first air-discharge port.

3. The child restraint of claim 2, wherein the side wall is also formed to include a second air-discharge port separated from the first air-discharge port and arranged to open into the first air chamber and the first vent means is coupled to the side wall and arranged normally to close the second air-discharge port.

4. The child restraint of claim 3, wherein the first vent means includes a first valve unit coupled to the side wall and configured to regulate flow of air through the first air-discharge port and a separate second valve unit coupled to the wall and configured to regulate flow of air through the second air-discharge port.

5. The child restraint of claim 1, wherein the first valve unit includes a first valve flap coupled to the first air bag and a second valve flap coupled to the first air bag and mounted for movement relative to the first valve flap from a port-closing position wherein the first and second valve flaps cooperate to block discharge of air from the first air chamber to the surroundings through the first air-discharge port to a port-opening position wherein the first and second valve flaps cooperate to form an air-conducting passageway therebetween to allow discharge of air from the first air chamber to the surroundings through the first air-discharge port.

6. The child restraint of claim 5, wherein the first and second valve flaps are arranged to lie in overlapping relation to one another when the first and second valve flaps assume the port-closing position and to lie in separated relation to one another when the first and second valve flaps assume the port-opening position.

7. The child restraint of claim 5, wherein the first and second valve flaps are arranged to lie in fully overlapping relation to one another when the first and second valve flaps assume the port-closing position and in partly overlapping relation to one another to cause a first edge of the first valve flap to lie in spaced-apart relation to a first edge of the second valve flap to form the air-conducting passage therebetween when the first and second valve flaps assume the port-opening position.

8. The child restraint of claim 1, wherein the first air bag includes an interior surface defining a boundary of the first air chamber and an exterior surface facing away from the first air chamber and the first vent means is coupled to the exterior surface of the first air bag.

9. The child restraint of claim 8, wherein the exterior surface is arranged to lie between the interior surface and the first vent means.

10. The child restraint of claim 8, wherein the first vent means includes a first valve flap having a first anchor coupled to the exterior surface and a first closure coupled to the first anchor for movement between a normally closed position blocking discharge of air from the first air chamber to the surroundings through the first air-discharge port and an opened position lying away from the exterior surface to unblock the first air-discharge port to allow discharge of air from the first air chamber to the surroundings through the first air-discharge port.

11. The child restraint of claim 10, wherein the first vent means also includes a second valve flap having a second anchor coupled to the exterior surface and arranged to lie in spaced-apart relation to the first anchor of the first valve flap to locate the first air-discharge port therebetween and a second closure coupled to the second anchor for movement between a normally closed position trapping the first closure between the exterior surface and the second closure to block discharge of air from the first air chamber to the surroundings through the first air-discharge port and an opened position lying away from the exterior surface and freeing the first closure to move away from the exterior surface to unblock the first air-discharge port to allow discharge of air from the first air chamber to the surroundings through the first air-discharge port.

12. The child restraint of claim 1, wherein the first force dissipater further includes a second air bag arranged to lie alongside the first air bag and formed to include a second air chamber and a second air-discharge port opening into the second air chamber and second vent means coupled to the second air bag for venting pressurized air developed in the second air chamber through the second air-discharge port during deformation of the second air bag caused by exposure of the second air bag to an external impact force associated with the external impact force applied to the juvenile vehicle seat.

13. The child restraint of claim 12, wherein the first vent means includes a first airbag valve unit associated with the first air-discharge port formed in the first air bag and configured to include a first valve flap coupled to the first air bag and a second valve flap coupled to the first air bag and mounted for movement relative to the first valve flap of the first air bag valve unit from a port-closing position wherein the first and second valve flaps of the first airbag valve unit cooperate to block discharge of air from the first air chamber to the surroundings through the first air-discharge port to a port-opening position wherein the first and second valve flaps of the first airbag valve unit cooperate to form an air-conducting passageway therebetween to allow discharge of air from the first air chamber to the surroundings through the first air-discharge port and wherein the second vent means includes a second airbag valve unit associated with the second air-discharge port formed in the second air bag and configured to include a first valve flap coupled to the second air bag and a second valve flap coupled to the second air bag and mounted for movement relative to the first valve flap of the second airbag valve unit from a port-closing position wherein the first and second valve flaps of the second airbag valve unit cooperate to block discharge of air from the second air chamber to the surroundings through the second air-discharge port to a port-opening position wherein the first and second valve flaps of the second airbag valve unit cooperate to form an air-conducting passageway therebetween to allow discharge of air from the second air chamber to the surroundings through the second air-discharge port.

14. A child restraint comprising
a juvenile vehicle seat and
an energy-dissipation system coupled to the juvenile vehicle seat, the energy-dissipation system including a first ride-down pad including a first force dissipater coupled to the juvenile vehicle seat and a second force dissipater arranged to lie in spaced-apart relation to the juvenile vehicle seat to locate the first force dissipater therebetween,
wherein the first force dissipater includes a first air bag formed to include a first air chamber and separate first and second air-discharge ports opening into the first air chamber and first vent means coupled to the first air bag for venting pressurized air developed in the first air chamber through the first and second air-discharge ports during deformation of the first air bag caused by exposure of the first air bag to an external impact force associated with an external impact force applied to the juvenile vehicle seat, and
wherein the second force dissipater includes a second air bag formed to include a second air chamber and separate first and second air-discharge ports opening into the second air chamber and second vent means coupled to the second air bag for venting pressurized air developed in the second air chamber through the first and second air-discharge ports formed in the second air bag during deformation of the second air bag caused by exposure of the second air bag to an external impact force associated with the external impact force applied to the juvenile vehicle seat.

15. The child restraint of claim 14, wherein the first vent means includes a first valve unit coupled to the first air bag and configured to regulate flow of air through the first air-discharge port formed in the first air bag and a second valve unit coupled to the first air bag and configured to regulate flow of air through the second air-discharge port formed in the first air bag and wherein the second vent means includes a first valve unit coupled to the second air bag and configured to regulate flow of air through the first air-discharge port formed in the second air bag and a second valve unit coupled to the second air bag and configured to regulate flow of air through the second air-discharge port formed in the second air bag.

16. The child restraint of claim 15, wherein the first air bag includes an interior surface defining a boundary of the first air chamber and an exterior surface facing away from the first air chamber, the first valve unit of the first vent means is coupled to the exterior surface of the first-air bag, and the second valve unit of the first vent means is coupled to the exterior surface of the first air bag, and wherein the second air bag includes an interior surface defining a boundary of the second air chamber and an exterior surface facing away from the second air chamber, the first valve unit of the second vent means is coupled to the exterior surface of the second air bag, and the second valve unit of the second vent means is coupled to the exterior surface of the second air bag.

17. The child restraint of claim 16, wherein
the first valve unit of the first vent means includes a first valve flap coupled to the exterior surface of the first air bag and a second valve flap coupled to the exterior surface of the first air bag and mounted for movement relative to the first valve flap of the first vent means from a port-closing position wherein the first and second valve flaps of the first valve unit of the first vent means cooperate to block discharge of air from the first air chamber to the surrounding through the first air-discharge port of the first air bag to a port-opening position wherein the first and second valve flaps of the first valve unit of the first vent means cooperate to form a first air-conducting passageway therebetween to allow discharge of air from the first air chamber to the surroundings through the first air-discharge port of the first air bag,
the second valve unit of the first vent means includes a first valve flap coupled to the exterior surface of the first air bag and a second valve flap coupled to the exterior surface of the first air bag and a second valve flap coupled to the exterior surface of the first air bag and mounted for movement relative to the second valve flap of the first vent means from a port-closing position wherein the first and second valve flaps of the second valve unit of the first vent means cooperate to block discharge of air from the first air chamber to the surroundings through the second air-discharge port of the first air bag to a port-opening position wherein the first and second valve flaps of the second valve unit of the first vent means cooperate to form a second air-conducting passageway therebetween to allow discharge of air from the first air chamber to the surroundings through the second air-discharge port of the first air bag,
the first valve unit of the second vent means includes a first valve flap coupled to the exterior surface of the second air bag and a second valve flap coupled to the exterior surface of the second air bag and mounted for movement relative to the first valve flap of the second vent means from a port-closing position wherein the first and second valve flaps of the first valve unit of the second vent means cooperate to block discharge of air from the second air chamber to the surroundings through the first air-discharge port of the second air bag to a port-opening position wherein the first and second valve flaps of the first valve unit of the second vent means cooperate to form a third air-conducting passageway therebetween to allow discharge of air from the second air chamber to the surroundings through the first air-discharge port of the second air bag, and
the second valve unit of the second vent means includes a first valve flap coupled to the exterior surface of the second air bag and a second valve flap coupled to the exterior surface of the second air bag and mounted for movement relative to the first valve flap of the second vent means from a port-closing position wherein the fifth and second valve flaps of the second valve unit of the second vent means cooperate to block discharge of air from the second air chamber to the surroundings through the second air-discharge port of the second air bag to a port-opening position wherein the first and second valve flaps of the second valve unit of the second vent means cooperate to form a fourth air-conducting passageway therebetween to allow discharge of air from the second air chamber to the surroundings through the second air-discharge port of the second air bag.

18. A child restraint comprising a juvenile vehicle seat an energy-dissipation system coupled to the juvenile vehicle seat, the energy-dissipation system including a first force dissipater including a first air bag formed to include a first air chamber and a first air-discharge port opening into the first air chamber and first vent means coupled to the first air bag for venting pressurized air developed in the first air chamber through the first air-discharge port during deformation of the first air bag caused by exposure of the first air bag to an external impact force associated with an external impact force applied to the juvenile vehicle seat, wherein the first air bag is formed to locate the first air-discharge port between the first air chamber and the first vent means wherein the first air bag includes an interior surface defining a boundary of the first air chamber and an exterior surface facing away from the first air chamber and the first vent means is coupled to the exterior surface of the first air bag wherein the first vent means includes a first valve flap having a first anchor coupled to the exterior surface and a first closure coupled to the first anchor for movement between a normally closed position blocking discharge of air from the first air chamber to the surroundings through the first air-discharge port and an opened position lying away from the exterior surface to unblock the first air-discharge port to allow discharge of air from the first air chamber to the surroundings through the first air-discharge port and wherein the first vent means also includes a second valve flap having a second anchor coupled to the exterior surface and arranged to lie in spaced-apart relation to the first anchor of the first valve flap to locate the first air-discharge port therebetween and a second closure coupled to the second anchor for movement between a normally closed position trapping the first closure between the exterior surface and the second closure to block discharge of air from the first air chamber to the surroundings through the first air-discharge port and an opened position lying away from the exterior surface and freeing the first closure to move away from the exterior surface to unblock the first air-discharge port to allow discharge of air from the first air chamber to the surroundings through the first air-discharge port.

* * * * *